United States Patent
Flynn

(10) Patent No.: US 11,625,866 B2
(45) Date of Patent: Apr. 11, 2023

(54) GEOMETRY ENCODING USING OCTREES AND PREDICTIVE TREES

(71) Applicant: Apple Inc., Cupertino, CA (US)

(72) Inventor: David Flynn, Munich (DE)

(73) Assignee: Apple Inc., Cupertino, CA (US)

(*) Notice: Subject to any disclaimer, the term of this patent is extended or adjusted under 35 U.S.C. 154(b) by 181 days.

(21) Appl. No.: 17/145,212

(22) Filed: Jan. 8, 2021

(65) Prior Publication Data

US 2021/0217206 A1 Jul. 15, 2021

Related U.S. Application Data

(60) Provisional application No. 62/959,099, filed on Jan. 9, 2020.

(51) Int. Cl.
| | |
|---|---|
| G06T 9/40 | (2006.01) |
| G06T 15/08 | (2011.01) |
| G06T 15/10 | (2011.01) |
| G06T 7/593 | (2017.01) |
| H04N 19/167 | (2014.01) |
| H04N 19/46 | (2014.01) |

(Continued)

(52) U.S. Cl.
CPC .......... *G06T 9/40* (2013.01); *G06T 7/593* (2017.01); *G06T 15/08* (2013.01); *G06T 15/10* (2013.01); *H04N 19/167* (2014.11); *H04N 19/46* (2014.11); *H04N 19/597* (2014.11); *H04N 19/96* (2014.11); *G06T 2207/10028* (2013.01)

(58) Field of Classification Search
CPC ...... H04N 19/46; H04N 19/597; H04N 19/96; H04N 19/167; G06T 9/001; G06T 9/40; G06T 7/593; G06T 15/08; G06T 15/10; G06T 2207/10028
See application file for complete search history.

(56) References Cited

U.S. PATENT DOCUMENTS

| | | | |
|---|---|---|---|
| 5,793,371 | A | 8/1998 | Deering |
| 5,842,004 | A | 11/1998 | Deering |

(Continued)

FOREIGN PATENT DOCUMENTS

| | | |
|---|---|---|
| CA | 309618 | 10/2019 |
| CN | 10230618 | 1/2012 |

(Continued)

OTHER PUBLICATIONS

Stefan Gumhold et al., "Predictive Point-Cloud Compression", dated Jul. 31, 2005, pp. 1-7.

(Continued)

*Primary Examiner* — Phi Hoang
(74) *Attorney, Agent, or Firm* — Alexander A. Knapp; Kowert, Hood, Munyon, Rankin & Goetzel, P.C.

(57) ABSTRACT

An encoder is configured to compress point cloud geometry information using an octree/predictive tree combination geometric compression technique that embeds predictive trees in leaf nodes of an octree instead of encoding additional octree occupancy symbols for the leaf nodes. Alternatively an encoder may be configured to embed octrees in leaf nodes of a predictive tree structure. Similarly a decoder is configured to generate a reconstructed three-dimensional geometry from a bit stream including combined octree and predictive tree encoding information.

21 Claims, 9 Drawing Sheets

(51) Int. Cl.
*H04N 19/597* (2014.01)
*H04N 19/96* (2014.01)

(56) References Cited

U.S. PATENT DOCUMENTS

| | | |
|---|---|---|
| 5,867,167 A | 2/1999 | Deering |
| 5,870,094 A | 2/1999 | Deering |
| 5,905,502 A | 5/1999 | Deering |
| 5,933,153 A | 8/1999 | Deering |
| 6,018,353 A | 1/2000 | Deering |
| 6,028,610 A | 2/2000 | Deering |
| 6,088,034 A | 7/2000 | Deering |
| 6,188,796 B1 | 2/2001 | Kadono |
| 6,215,500 B1 | 4/2001 | Deering |
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,679,647 B2 | 3/2010 | Stavely et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 8,040,355 B2 | 10/2011 | Burley |
| 3,055,070 A1 | 11/2011 | Bassi et al. |
| 8,264,549 B2 | 9/2012 | Tokiwa et al. |
| 8,411,932 B2 | 4/2013 | Liu et al. |
| 8,520,740 B2 | 8/2013 | Flachs |
| 8,566,736 B1 | 10/2013 | Jacob |
| 8,643,515 B2 | 2/2014 | Cideciyan |
| 8,780,112 B2 | 7/2014 | Kontkanen et al. |
| 8,805,097 B2 | 8/2014 | Ahn et al. |
| 8,884,953 B2 | 11/2014 | Chen et al. |
| 9,064,311 B2 | 6/2015 | Mammou et al. |
| 9,064,331 B2 | 6/2015 | Yamashita |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,621,775 B2 | 4/2017 | Ng et al. |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,108,867 B1 | 10/2018 | Vallespi-Gonzalez |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | Arlinsky et al. |
| 10,546,415 B2 | 1/2020 | Petkov |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou et al. |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 | 3/2021 | Li |
| 10,939,129 B2 | 3/2021 | Mammou |
| 10,977,773 B2 | 4/2021 | Hemmer |
| 10,984,541 B2 | 4/2021 | Lim |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2 | 5/2021 | Oh |
| 11,044,478 B2 | 6/2021 | Tourapis et al. |
| 11,044,495 B1 | 6/2021 | Dupont |
| 11,057,564 B2 | 7/2021 | Johnson et al. |
| 11,095,908 B2 | 8/2021 | Dawar |
| 11,113,845 B2 | 9/2021 | Tourapis et al. |
| 11,122,102 B2 | 9/2021 | Oh |
| 11,122,279 B2 | 9/2021 | Joshi |
| 11,132,818 B2 | 9/2021 | Mammou et al. |
| 11,200,701 B2 | 12/2021 | Aksu |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2 | 2/2022 | Roimela |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2 | 5/2022 | Melkote Krishnaprasad |
| 11,363,309 B2 | 6/2022 | Tourapis et al. |
| 11,386,524 B2 | 7/2022 | Mammou et al. |
| 11,398,058 B2 | 7/2022 | Zakharchenko |
| 11,450,030 B2 | 9/2022 | Mammou |
| 11,503,367 B2 * | 11/2022 | Yea .............. H04N 19/196 |
| 2002/0181741 A1 | 12/2002 | Masukura |
| 2004/0217956 A1 | 11/2004 | Besl et al. |
| 2006/0133508 A1 | 6/2006 | Sekiguchi |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2008/0225116 A1 | 9/2008 | Kang |
| 2009/0016598 A1 | 1/2009 | Lojewski |
| 2009/0027412 A1 | 1/2009 | Burley |
| 2009/0087111 A1 | 4/2009 | Noda et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman |
| 2010/0208807 A1 | 8/2010 | Sikora |
| 2010/0260429 A1 | 10/2010 | Ichinose |
| 2010/0260729 A1 | 10/2010 | Cavato et al. |

(56) References Cited

U.S. PATENT DOCUMENTS

| | | |
|---|---|---|
| 2010/0296579 A1 | 11/2010 | Panchal et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |
| 2013/0156101 A1 | 6/2013 | Lu |
| 2013/0195352 A1 | 8/2013 | Nystad |
| 2013/0202197 A1 | 8/2013 | Reeler |
| 2013/0321418 A1 | 12/2013 | Kirk |
| 2013/0322738 A1 | 12/2013 | Oh |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0176672 A1 | 6/2014 | Lu |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Booh |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0249401 A1 | 8/2017 | Ckart et al. |
| 2017/0323617 A1 | 11/2017 | Yang |
| 2017/0337724 A1 | 11/2017 | Gervais |
| 2017/0347100 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0018786 A1 | 1/2018 | Jakubiak |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0191957 A1 | 7/2018 | Miller et al. |
| 2018/0192061 A1 | 7/2018 | He |
| 2018/0253867 A1 | 9/2018 | Laroche |
| 2018/0260416 A1 | 9/2018 | Elkaim |
| 2018/0268570 A1 | 9/2018 | Budagavi |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0045157 A1 | 2/2019 | Venshtain |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0141248 A1 | 5/2019 | Hubert |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1 | 11/2019 | Pavlovic |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0151913 A1 | 5/2020 | Budagavi |
| 2020/0153885 A1 | 5/2020 | Lee |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi et al. |
| 2020/0219288 A1 | 7/2020 | Joshi |
| 2020/0219290 A1 | 7/2020 | Tourapis et al. |
| 2020/0228836 A1 | 7/2020 | Schwarz et al. |
| 2020/0244993 A1 | 7/2020 | Schwarz et al. |
| 2020/0260063 A1 | 8/2020 | Hannuksela |
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0294271 A1 | 9/2020 | Ilola |
| 2020/0302571 A1 | 9/2020 | Schwartz |
| 2020/0302578 A1 | 9/2020 | Graziosi |
| 2020/0302621 A1 | 9/2020 | Kong |
| 2020/0302651 A1 | 9/2020 | Flynn |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2020/0396489 A1* | 12/2020 | Flynn ............... H03M 7/405 |
| 2020/0413096 A1* | 12/2020 | Zhang ............... H04N 19/119 |
| 2021/0005006 A1 | 1/2021 | Oh |
| 2021/0006805 A1 | 1/2021 | Urban et al. |
| 2021/0006833 A1 | 1/2021 | Tourapis et al. |
| 2021/0012536 A1 | 1/2021 | Mammou et al. |

(56) References Cited

U.S. PATENT DOCUMENTS

| | | |
|---|---|---|
| 2021/0012538 A1 | 1/2021 | Wang |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0056732 A1 | 2/2021 | Han |
| 2021/0084333 A1 | 3/2021 | Zhang |
| 2021/0090301 A1 | 3/2021 | Mammou et al. |
| 2021/0097723 A1 | 4/2021 | Kim et al. |
| 2021/0097725 A1 | 4/2021 | Mammou et al. |
| 2021/0097726 A1 | 4/2021 | Mammou et al. |
| 2021/0099701 A1 | 4/2021 | Tourapis et al. |
| 2021/0103780 A1 | 4/2021 | Mammou et al. |
| 2021/0104014 A1 | 4/2021 | Kolb, V |
| 2021/0104073 A1 | 4/2021 | Yea et al. |
| 2021/0104075 A1 | 4/2021 | Mammou et al. |
| 2021/0104077 A1 | 4/2021 | Zakharchenko et al. |
| 2021/0105022 A1 | 4/2021 | Flynn et al. |
| 2021/0105493 A1 | 4/2021 | Mammou et al. |
| 2021/0105504 A1 | 4/2021 | Hur et al. |
| 2021/0112281 A1 | 4/2021 | Wang |
| 2021/0118190 A1 | 4/2021 | Mammou et al. |
| 2021/0119640 A1 | 4/2021 | Mammou et al. |
| 2021/0142522 A1 | 5/2021 | Li |
| 2021/0150765 A1 | 5/2021 | Mammou |
| 2021/0150766 A1 | 5/2021 | Mammou et al. |
| 2021/0150771 A1* | 5/2021 | Huang ................ G06T 17/005 |
| 2021/0158608 A1 | 5/2021 | Boggs et al. |
| 2021/0166432 A1 | 6/2021 | Wang |
| 2021/0166436 A1 | 6/2021 | Zhang |
| 2021/0168386 A1 | 6/2021 | Zhang |
| 2021/0183112 A1 | 6/2021 | Mammou et al. |
| 2021/0183113 A1 | 6/2021 | Han et al. |
| 2021/0185331 A1 | 6/2021 | Mammou et al. |
| 2021/0195162 A1 | 6/2021 | Chupeau et al. |
| 2021/0201541 A1* | 7/2021 | Lasserre ................ H04N 19/20 |
| 2021/0203989 A1 | 7/2021 | Wang |
| 2021/0211724 A1 | 7/2021 | Kim et al. |
| 2021/0217139 A1 | 7/2021 | Yano |
| 2021/0217203 A1 | 7/2021 | Kim et al. |
| 2021/0217206 A1 | 7/2021 | Flynn |
| 2021/0218969 A1 | 7/2021 | Lasserre |
| 2021/0218994 A1 | 7/2021 | Flynn |
| 2021/0233281 A1 | 7/2021 | Wang et al. |
| 2021/0248784 A1 | 8/2021 | Gao |
| 2021/0248785 A1 | 8/2021 | Zhang |
| 2021/0256735 A1 | 8/2021 | Tourapis et al. |
| 2021/0258610 A1 | 8/2021 | Iguchi |
| 2021/0264640 A1 | 8/2021 | Mammou et al. |
| 2021/0264641 A1 | 8/2021 | Iguchi |
| 2021/0266597 A1 | 8/2021 | Kim et al. |
| 2021/0281874 A1* | 9/2021 | Lasserre ............. H03M 7/3071 |
| 2021/0295569 A1 | 9/2021 | Sugio |
| 2021/0319593 A1 | 10/2021 | Flynn |
| 2021/0337121 A1 | 10/2021 | Johnson et al. |
| 2021/0383576 A1 | 12/2021 | Olivier |
| 2021/0400280 A1 | 12/2021 | Zaghetto |
| 2021/0407147 A1 | 12/2021 | Flynn |
| 2021/0407148 A1 | 12/2021 | Flynn |
| 2022/0030258 A1 | 1/2022 | Zhang |
| 2022/0084164 A1* | 3/2022 | Hur ........................... G06T 9/40 |
| 2022/0101555 A1 | 3/2022 | Zhang |
| 2022/0116659 A1 | 4/2022 | Pesonen |
| 2022/0164994 A1 | 5/2022 | Joshi |

FOREIGN PATENT DOCUMENTS

| | | |
|---|---|---|
| CN | 104408689 | 3/2015 |
| CN | 106651942 | 5/2017 |
| CN | 108632607 | 10/2018 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| WO | 200004506 | 1/2000 |
| WO | 2013022540 | 2/2013 |
| WO | 2017156462 | 9/2017 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

Pierre-Marie Gandoin et al, "Progressive Lossless Compression of Arbitrary Simplicial Complexes", Dated Jul. 1, 2002, pp. 1-8.

Ruwen Schnabel et al., "Octree-based Point-Cloud Compression", Eurographics Symposium on Point-Based Graphics, 2006, pp. 1-11.

Yuxue Fan et al., "Point Cloud Compression Based on Hierarchical Point Clustering", Signal and Information Processing Association Annual Summit and Conference (APSIPA), IEEE, 2013, pp. 1-7.

Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.

Garcia, et al., "Context-Based Octree Coding for Point Cloud Video", 2017 IEEE International Conference on Image Processing (ICIP), 2017, pp. 1412-1416.

Merry et al., Compression of dense and regular point clouds, Proceedings of the 4th international conference on Computer graphics, virtual reality, visualisation and interaction in Africa (pp. 15-20). ACM. (Jan. 2006).

Lustosa et al., Database system support of simulation data, Proceedings of the VLDB Endowment 9.13 (2016): pp. 1329-1340.

Hao Liu, et al., "A Comprehensive Study and Comparison of Core Technologies for MPEG 3D Point Cloud Compression", arXiv:1912.09674v1, Dec. 20, 2019, pp. 1-17.

Styliani Psomadaki, "Using a Space Filing Curve For The Management of Dynamic Point Cloud Data in a Relational DBMS", Nov. 2016, pp. 1-158.

Remi Cura et al, "Implicit Lod for Processing and Classification in Point Cloud Servers", dated Mar. 4, 2016, pp. 1-18.

Yan Huang et al, Octree-Based Progressive Geometry Coding of Point Clouds, dated Jan. 1, 2006, pp. 1-10.

Khaled Mammou, et al., "G-PCC codec description v1", International Organisation for Standardisation, ISO/IEC JTC1/SC29/WG11, Oct. 2018, pp. 1-32.

"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.

G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.

Jianqiang Liu et al, "Data-Adaptive Packing Method for Compresssion of Dynamic Point Cloud Sequences", dated Jul. 8, 2019, pp. 904-909.

Jorn Jachalsky et al, "D4.2.1 Scene Analysis with Spatio-Temporal", dated Apr. 30, 2013, pp. 1-60.

Lasserre S et al, "Global Motion Compensation for Point Cloud Compression in TMC3", dated Oct. 3, 2018, pp. 1-28.

D. Graziosi et al, "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.

(56) References Cited

OTHER PUBLICATIONS

"Continuous improvement of study text of ISO-IEC CD 23090-5 Video-Based Point Cloud Compression" dated May 8, 2019, pp. 1-140.
Mehlem D. et al, "Smoothing considerations for V-PCC", dated Oct. 2, 2019, pp. 1-8.
Flynn D et al, "G-PCC Bypass coding of bypass bins", dated Mar. 21, 2019, pp. 1-3.
Sharman K et al, "CABAC Packet-Based Stream", dated Nov. 18, 2011, pp. 1-6.
Lasserre S et al, "On bypassed bit coding and chunks", dated Apr. 6, 2020, pp. 1-3.
David Flynn et al, "G-pcc low latency bypass bin coding". dated Oct. 3, 2019, pp. 1-4.
Chuan Wang, et al., "Video Vectorization via Tetrahedral Remeshing", IEEE Transactions on Image Processing, vol. 26, No. 4, Apr. 2017, pp. 1833-1844.
Keming Cao, et al., "Visual Quality of Compressed Mesh and Point Cloud Sequences", IEEE Access, vol. 8, 2020. pp. 171203-171217.
W. Zhu, et al., "Lossless point cloud geometry compression via binary tree partition and intra prediction," 2017 IEEE 19th International Workshop on Multimedia Signal Prcoessing (MMSP), 2017, pp. 1-6, doi: 1.1109/MMSP.2017.8122226 (Year 2017).
Jang et al., Video-Based Point-Cloud-Compression Standard in MPEG: From Evidence Collection to Committee Draft [Standards in a Nutshell], IEEE Signal Processing Magazine, Apr. 2019, pp. 1-6.
Pragyana K. Mishra, "Image and Depth Coherent Surface Description", Doctoral dissertation, Carnegie Mellon University, The Robotics Institute, Mar. 2005, pp. 1-152.
Robert Cohen, "CE 3.2 point-based prediction for point loud compression", dated Apr. 2018, pp. 1-6.
Jang et al., Video-Based Point-Cloud-Compression Standard in MPEG: From Evidence Collection to Committee Draft [Standards in a Nutshell], IEEE Signal Processing Magazine, Apr. 2019.
Ekekrantz, Johan, et al., "Adaptive Cost Function for Pointcloud Registration," arXiv preprint arXiv: 1704.07910 (2017), pp. 1-10.
Vincente Morell, et al., "Geometric 3D point cloud compression", Copyright 2014 Elsevier B.V. All rights reserved, pp. 1-18.
U.S. Appl. No. 17/523,826, filed Nov. 10, 2021, Mammou, et a.
Chou, et al., "Dynamic Polygon Clouds: Representation and Compression for VR/AR", ARXIV ID: 1610.00402, Published Oct. 3, 2016, pp. 1-28.
U.S. Appl. No. 17/804,477, filed May 27, 2022, Khaled Mammou, et al.
Jingming Dong, "Optimal Visual Representation Engineering and Learning for Computer Vision", Doctoral Dissertation, UCLA, 2017, pp. 1-151.
Khaled Mammou et al, "Working Draft of Point Cloud Coding for Category 2 (Draft 1)", dated Apr. 2018, pp. 1-38.
Khaled Mammou et al , "Input Contribution", dated Oct. 8, 2018, pp. 1-42.
Benjamin Bross et al, "High Effeciency Video Coding (HEVC) Text Specification Draft 8", dated Jul. 23, 2012, pp. 1-86.
JunTaek Park et al, "Non-Overiapping Patch Packing in TMC2 with HEVC-SCC", dated Oct. 8, 2018, pp. 1-6.
Ismael Daribo, et al., "Efficient Rate-Distortion Compression on Dynamic Point Cloud for Grid-Pattern-Based 3D Scanning Systems", 3D Research 3.1, Springer, 2012, pp. 1-9.
Cohen Robert A et al, "Point Cloud Attribute Compression Using 3-D Intra Prediction and Shape-Adaptive Transforms", dated Mar. 30, 2016, pp. 141-150.
Sebastian Schwarz, et al., "Emerging MPEG Standards for Point Cloud Compression", IEEE Journal on Emerging and Selected Topics In Circuits and Systems, vol. 9, No. 1, Mar. 2019, pp. 133-148.
Li Li, et al., Efficient Projected Frame Padding for Video-based Point Cloud Compression, IEEE Transactions on Multimedia, doi: 10.100/TMM.2020.3016894, 2020, pp. 1-14.
Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.
Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.
Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.
Bin Lu, et al., "Massive Point Cloud Space Management Method Based on Octree-Like Encoding", Arabian Journal forScience Engineering, https://doi.org/10.1007/s13369-019-03968-7, 2019, pp. 1-15.
Wikipedia, "k-d tree", Aug. 1, 2019, Retrieved from URL: https://en.wikipedia.org/w.indec.php?title=Kd_tree&oldid=908900837, pp. 1-9.
"David Flynn et al., "G-PCC: A hierarchical geometry slice structure", MPEG Meeting, Retrieved from http://phenix.intevry.fr/mpeg/doc_end_user/documents/131_Online/wg11/m54677-v1-m54677_v1.zip, Jun. 28, 2020, pp. 1-9".
""G-PCC Future Enchancements", MPEG Metting, Oct. 7-11, 2019, (Motion Picture Expert Group of ISO/IECJTC1/SC29-WG11), Retrieved from http://phenix.int-evry.fr/mpeg/doc_end_user/documents/128_Geneva/wg11/w18887.zipw18887/w18887 on Dec. 23, 2019, pp. 1-30".
Miska M. Hannuksela, "On Slices and Tiles", JVET Meeting, The Joint Video Exploration Team of ISO/IEC, Sep. 25, 2018, pp. 1-3.
David Flynn, "International Organisation for Standardisation Organisation International De Normalisation ISO/IEC JTC1/SC29/WG11 Coding of Moving Pictures and Audio", dated Apr. 2020. pp. 1-9.
R. Mekuria, et al., "Design, Implementation and Evaluation of a Point Cloud Codec for Tele-Immersive Video", IEEE Transactions on Circuits and Systems for Video Technology 27.4, 2017, pp. 1-14.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
Tim Golla et al., "Real-time Point Cloud Compression", IROS, 2015, pp. 1-6.
Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Tilo Ochotta et al, "Image-Based Surface Compression", dated Sep. 1, 2008, pp. 1647-1663.
U.S. Appl. No. 17/691,754, filed Mar. 10, 2022, Khaled Mammou.
U.S. Appl. No. 17/718,647, filed Apr. 12, 2022, Alexandros Tourapis, et al.

* cited by examiner

Octree node is marked unoccupied

GEOMETRY ENCODING USING OCTREES AND PREDICTIVE TREES

PRIORITY CLAIM

This application claims benefit of priority to U.S. Provisional Application Ser. No. 62/959,099, entitled "GEOMETRY ENCODING USING OCTREES AND PREDICTIVE TREES", filed Jan. 9, 2020, and which is incorporated herein by reference in its entirety.

BACKGROUND

Technical Field

This disclosure relates generally to compression and decompression of volumetric data, such as point cloud data, comprising a plurality of points, each having associated spatial and/or attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" or other type of volumetric data comprising a set of points each having associated spatial information and/or one or more associated attributes. In some circumstances, a point cloud may include thousands of points, hundreds of thousands of points, millions of points, or even more points. Also, in some circumstances, volumetric data may be generated, for example in software, as opposed to being captured by one or more sensors. In either case, such volumetric data may include large amounts of data and may be costly and time-consuming to store and transmit.

SUMMARY OF EMBODIMENTS

In some embodiments, a system includes one or more sensors configured to capture points that collectively make up a volumetric data set, such as a point cloud, wherein each of the points comprises spatial information identifying a spatial location of the respective point and/or attribute information defining one or more attributes associated with the respective point. The system also include an encoder configured to compress the spatial and/or attribute information for the points. The encoder is configured to partition the plurality of points of the point cloud into an octree comprising a plurality of cubes and sub-cubes at different levels of the octree, wherein respective ones of the cubes comprises eight sub-cubes. Additionally, the encoder is configured to, for at least some of the nodes of the octree further encode spatial information for the at least some nodes using a predictive tree structure. Alternatively, the encoder may be configured to organize points using a predictive tree structure that includes one or more octrees stemming from nodes of the predictive tree. For example, a point cloud comprising points in three dimensional space may be encoded as a predictive tree that joins a plurality of octrees into a structure that collectively represents the spatial information of the point cloud. Also, in some embodiments, adaptive octree models may be used that permit coding of non-cubic volumes, which may result in some nodes of the octree having four or two sub-volumes (e.g. cuboids).

In some embodiments, an encoder as described above may further encode duplicate points that reside at a same or similar spatial location in 3D space. In some embodiments, in order to encode duplicate points, an encoder may signal a number of duplicate points for a respective node of a predictive tree, a node of an octree, or a node of a structure that incorporates both octree(s) and predictive tree(s). For example, instead of encoding multiple predictive trees to define two points that share the same spatial location in 3D space, an encoder may encode a single predictive tree that defines the location of the node and may further signal a number of points that reside at the spatial location (e.g. two points, three points, etc.). In some embodiments, it may be more efficient from a compression and signaling perspective to signal a quantity of duplicate points at a given node as opposed to signaling an additional predictive tree or additional octree nodes that have the same spatial location as another point of a signaled predictive tree or octree node.

In some embodiments, a method may include signaling spatial information for volumetric data, such as that of a point cloud, using a combination of predictive trees and octrees, as discussed above and herein. Also the method may include signaling duplicative points for nodes of the predictive tree or octree, as discussed above and herein. In some embodiments, a method may include a decoder receiving compressed volumetric data that has been compressed using a combination octree and predictive tree structure and/or signaled duplicate points as discussed above and herein, wherein the decoder uses the compressed volumetric data to reconstruct a three-dimensional geometry of the volumetric data, such as a geometry of a point cloud.

In some embodiments, a non-transitory computer readable medium stores program instructions, that when executed by one or more processors, cause the one or more processor to encode or decode volumetric data using a combination of predictive trees and octrees and/or signaled duplicate points, as described herein.

Various examples are described herein in terms of a point cloud. However, the encoder/encoding techniques and the decoder/decoding techniques described herein may be applied to various other types of 3D volumetric content representations, including meshes, three-degree of freedom plus (3DOF+) scenes or as alternatively referred to in some contexts as MPEG MIV material, lightfields, or other types of six-degree of freedom (6DOF) content.

Figure 1A:
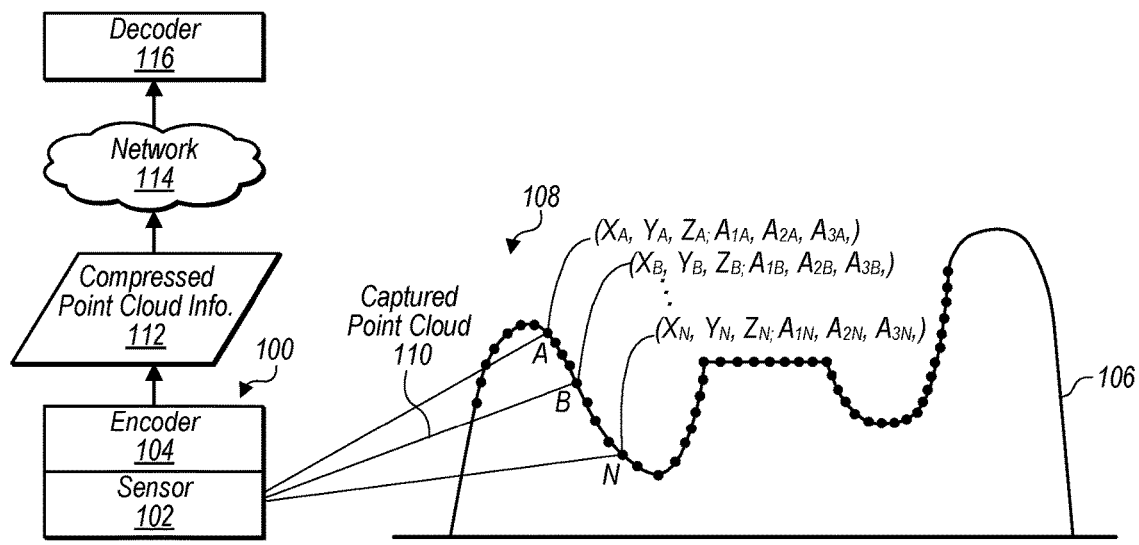
FIG. 1A illustrates a system comprising a sensor that captures information for points of a point cloud and an encoder that compresses attribute information and/or spatial information of the point cloud, where the compressed point cloud information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture volumetric data, such as point clouds, comprising thousands or millions of points in 2-D or 3-D space, such as via LIDAR systems, has increased. Also, the development of advanced display technologies, such as virtual reality or augmented reality systems, has increased potential uses for volumetric data, such as point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud spatial and attribute information. The compressed spatial and attribute information of the point cloud may be sent over a network in real-time or near real-time to a decoder that decompresses the compressed spatial and attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed spatial and/or attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes spatial information of a point cloud in addition to compressing attribute information for attributes of the points of the point cloud. For example, to compress spatial information a combination predictive tree and octree may be generated wherein, respective occupied/non-occupied states of each cube and/or sub-cube of the octree are encoded. For some nodes instead of encoding additional lower level octree sub-cubes, a predictive tree may be encoded for the node. Alternatively a predictive tree may predict a set of occupied nodes of the predictive tree and points that occupy respective ones of the nodes may further be defined in 3D space by respective octrees corresponding to respective ones of the occupied nodes of the predictive tree. Additionally, in some embodiments, an encoder may signal a number of duplicate points for a given point. This may be more efficient than generating redundant octree and/or predictive tree structures to define two points that have the same or similar spatial locations in 3D space.

In some embodiments, an encoder and/or decoder may determine a neighborhood occupancy configuration for a given cube of an octree that is being encoded or decoded. The neighborhood occupancy configuration may indicate occupancy states of neighboring cubes that neighbor the given cube being encoded. For example, a cube with for which neighboring cubes are occupied is more likely to also include occupied sub-cubes than a cube for which neighboring cubes are un-occupied.

FIG. 1A illustrates a system comprising a sensor that captures information for points of a point cloud and an encoder that compresses spatial and/or attribute information of the point cloud, where the compressed spatial and/or attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed point cloud information 112) that is transmitted via network 114 to decoder 116. In some embodiments, a compressed version of the point cloud, such as compressed point cloud information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Figure 1B:
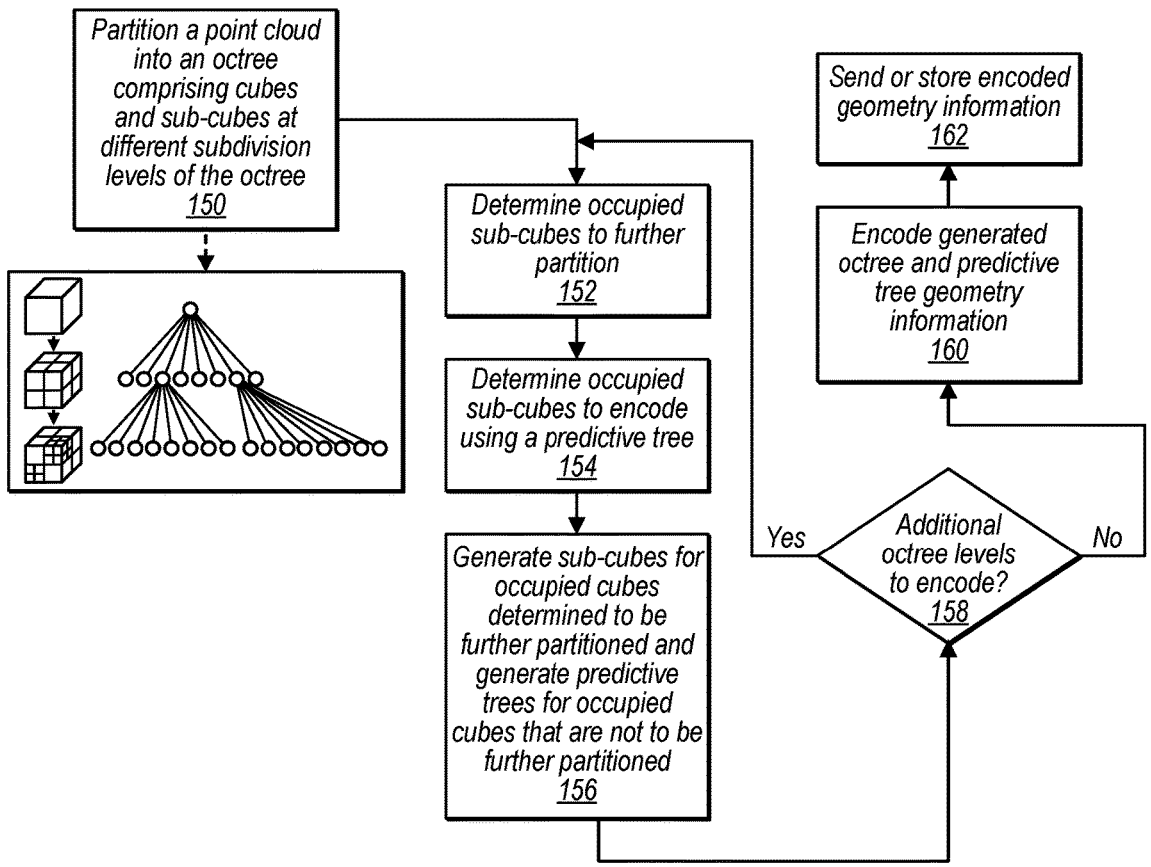
FIG. 1B illustrates a process for encoding spatial information of a point cloud using an octree-predictive tree combination structure, according to some embodiments.

FIG. 1B illustrates a process for encoding spatial information of a point cloud using an octree-predictive tree combination structure, according to some embodiments.

At 150, a volumetric data set, such as a point cloud, is partitioned into an octree comprising cubes and sub-cubes for at least a first level of the octree.

At 152, it is determined whether occupied ones of the cubes are to be further partitioned into sub-cubes, for example each cube may be partitioned into eight child sub-cubes. In some embodiments, each cube or sub-cube of an octree may be referred to herein as a node or sub-node of the octree. Also relationships between nodes and sub-nodes may be referred to herein as child nodes, parent nodes, grandparent nodes etc. For example a parent node (e.g. cube) may be partitioned into eight child nodes (e.g. sub-cubes). Also each child node may be further partitioned into eight grandchild nodes, etc. However, not every node occupied by two or more points may be further partitioned. For example for some nodes it may be determined that better coding efficiency may be achieved by defining the positions of the points in the occupied node using a predictive tree instead of using further octree nodes. Thus, at 154, it is determined whether respective ones of the occupied nodes or sub-nodes of the octree are to have their points encoded using a predictive tree.

At 156, occupancy information is generated for the occupied sub-cubes determined to be further partitioned. Also at 156, predictive tree information is generated for the occupied sub-cubes for which it was determined to define the location of the points of the occupied sub-cubes using a predictive tree structure.

At 158, it is determined if there are additional octree levels to encode, if so the process reverts to 152 and repeats for the next octree level. If not, at 160, the generated octree occupancy information and the generated predictive tree structures are encoded, for example using an arithmetic encoder or a Golomb encoder, as a few examples. At 162, the encoded geometry information is sent or stored for later use in reconstructing the geometry of the compressed point cloud.

Octree coding is a method that represents a sparse geometry by encoding the structure of an octree. The octree has a known depth, and therefore represents a cube of a known volume, e.g. $(2^d)^3$. By construction, each octree node has between one and eight child nodes (e.g. sub-cubes). The position of a point is encoded as the path through the octree. Each node of the tree contains a bitmap representing which child nodes are present. This bitmap is called the occupancy map, or occupancy information for a node.

Since the occupied state of a child node (e.g. sub-cube) is binary (present vs not present), it is not possible to predict occupancy by subtraction of a prediction. Instead, the occupancy map is encoded in a bit-serial manner using a context adaptive arithmetic entropy coder. Contexts may be selected by the following means:

Selected based on the occupancy state of the 6-neighbours of the node. This may permit crude detection of the local surface orientation.

Selected based on the occupancy state of the 12 adjacent child neighbors of previously coded nodes. This may allow greater accuracy in differentiating local geometry.

Selected based on predicted child occupancy for 26 neighbors. This may assist in differentiating finer local geometry and dense occupancy.

Figure 2:
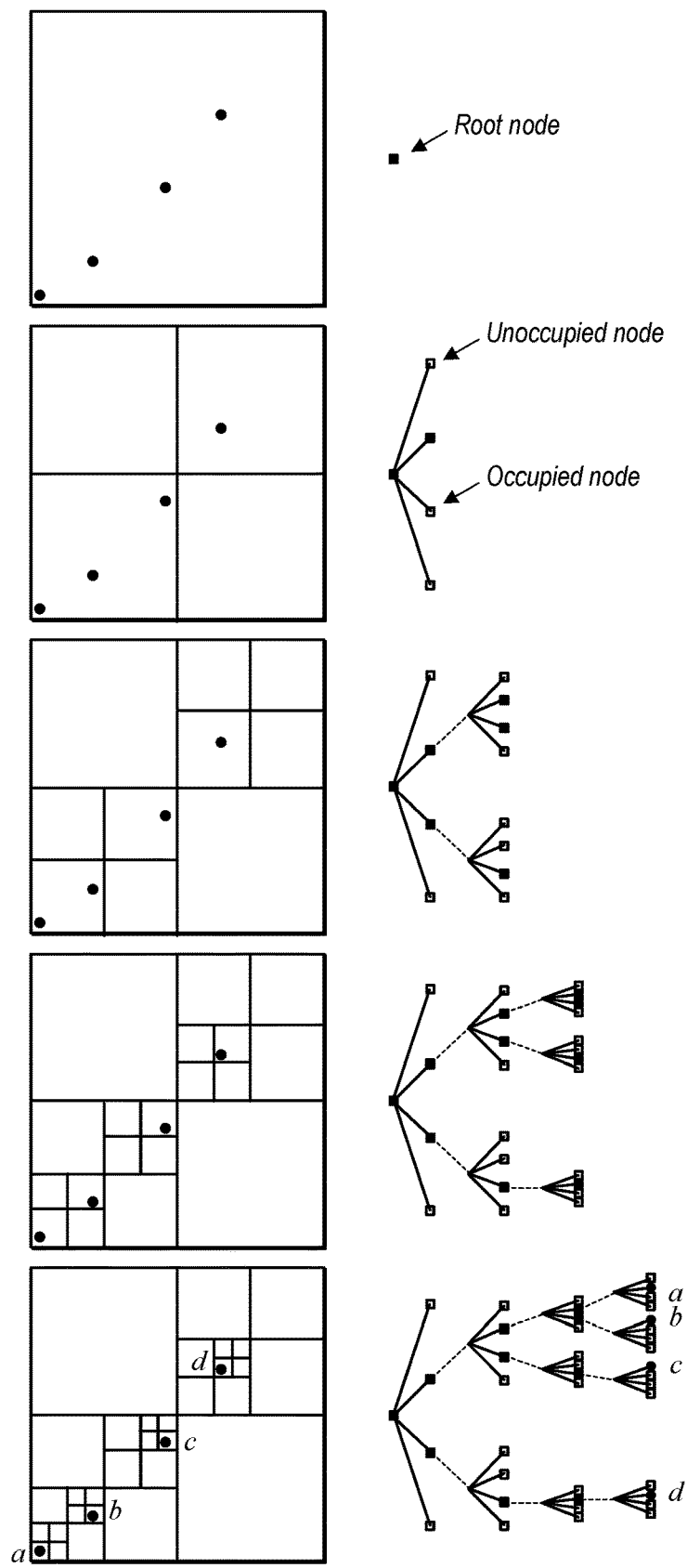
FIG. 2 illustrates an example octree structure, according to some embodiments.

For example, FIG. 2 illustrates an example octree structure, according to some embodiments.

In sparse regions, octree coding may not efficiently encode geometry. For example, for nodes (e.g. cubes or sub-cubes of an octree) with only a single occupied child, instead of coding an 8 bin occupancy map, a three bin child index may be coded instead. If a point is isolated, it may be preferable to directly code the remaining position since compression efficiency may be low (since there is no means to select contexts) and processing costs may be significantly reduced by early termination of the subtree.

In order to avoid signaling a termination flag in every node, a node may only contain an early termination flag if it is suitably isolated as determined by the 6-neighbours and parent occupancy. Such a node may be said to use an Inferred Direct Coding Mode (IDCM).

A predictive tree geometry coder that encodes spatial information using a predictive tree structure may represent point locations as nodes in a tree. The tree may be traversed depth-first, with each node having the following properties:

A prediction mode (e.g. delta from parent);

A residual that is combined with the prediction to generate the position of a single point; and A maximum of three child nodes.

For example, prediction modes of a predictive tree geometry coder may include:

PCM (pulse code modulation) mode, wherein the "residual" is a displacement from (0,0,0);

Delta mode, wherein the "residual" is the displacement from the parent node's reconstructed position;

Linear-2 mode, wherein the residual is the displacement from a prediction involving the parent and grandparent nodes' reconstructed position; or Linear-3 mode, wherein the residual is the displacement from a prediction involving the parent, grandparent, and great grandparent nodes' reconstructed position.

However, in some embodiments, to improve encoding efficiency and/or latency of encoding/decoding spatial information for a point cloud, the octree method and the predictive tree method may be combined.

For example, in some embodiments, one or more predictive trees may be used to refine an octree leaf node, irrespective of how the leaf mode is selected.

For an octree with maximum depth (height) H, each octree node represents a cube volume of size $(2^{(H-D)})^3$, where D is the tree depth (level) at which the node resides. The root node represents a volume of $(2^H)^3$. A leaf node is a node that, for whatever reason, is not further subdivided. Depending upon the exact octree representation, a leaf node may appear at any depth of the octree. By construction, the existence of an octree node implies that it is occupied (e.g. at least one point is present within its volume).

Figure 3:
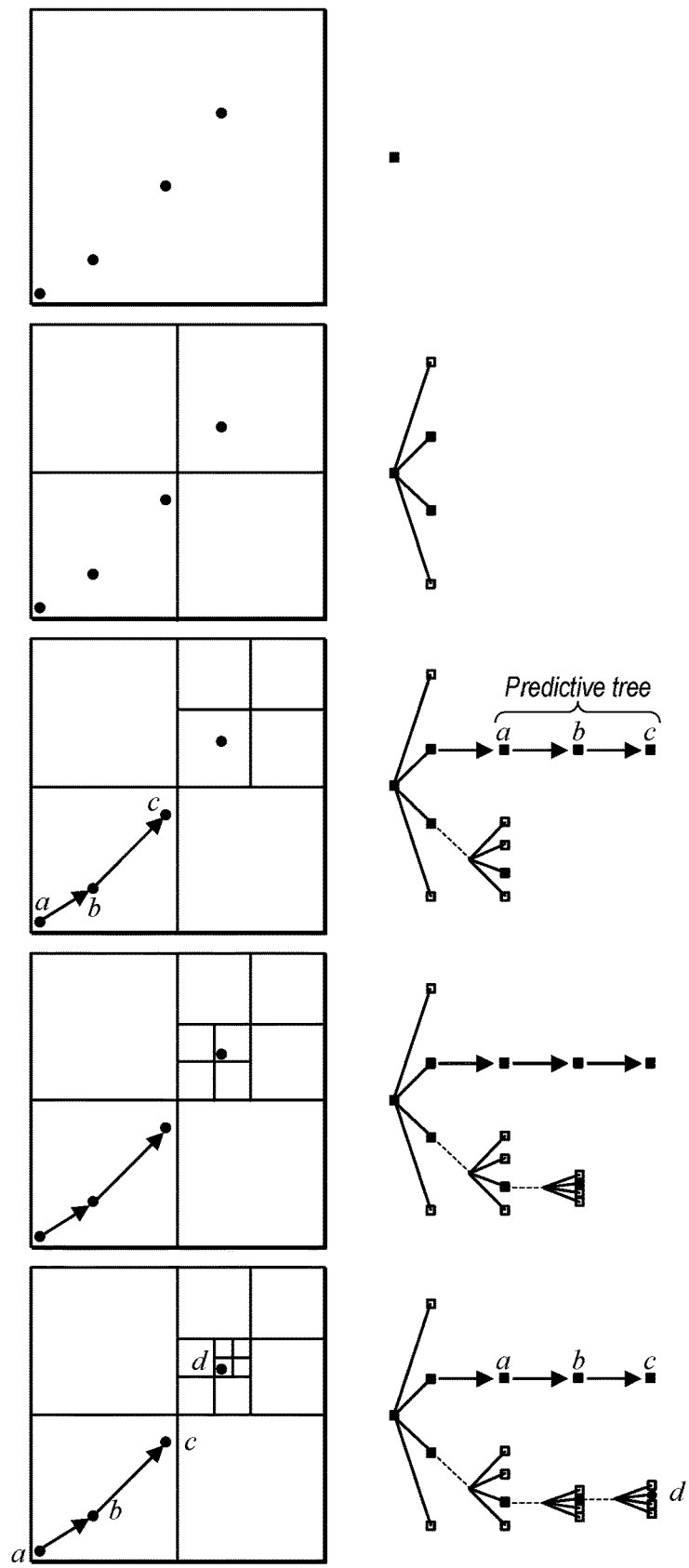
FIG. 3 illustrates an example octree-predictive tree combination structure, according to some embodiments.

In some embodiments, an octree encoding method and a predictive tree encoding method may be combined such that predictive coding is performed to generate one or more predictive trees within (or associated with) one or more octree leaf nodes. In some embodiments, all or only some leaf nodes of an octree may be further refined by a predictive tree coding scheme. For example, FIG. 3 illustrates one occupied node of an octree that is further refined using a predictive tree and another occupied node of the octree (e.g. the lower node in FIG. 3) that is further refined by partitioning the volume of the node into sub-cubes and encoding occupancy states of the sub-cubes. In some embodiments, only leaf nodes greater than a threshold size may be further refined by a predictive tree coding scheme.

In some embodiments, an octree encoding method is used to partially encode a point cloud volume. For example, for a cubic volume of size $(2^H)^3$, the first N, with N<H, octree levels are first coded. Subsequently, the resulting leaf nodes are further refined using a predictive tree coding scheme.

In some embodiments, each octree node identified as being an IDCM node is, instead of having a directly coded remaining position, further refined by a predictive tree coding scheme.

An octree may provide a means to quantize the represented position information in a uniform or non-uniform manner. This may be called in-tree, or in-loop position quantization or scaling. Each position may be quantized by a step size, and only the quantized information may be encoded. During reconstruction, after decoding the quantized point position, the quantized position may be scaled by a scale factor. If the step size is sufficiently large, multiple points may be merged into a single coarser position. The quantization step size may be specified or determined on a per-node basis, or for a set of nodes. In some embodiments, the octree leaf nodes generated by in-tree quantization may be further refined using a predictive tree coder.

In some embodiments, a leaf node of an octree may be encoded, wherein an encoder conditionally chooses the refinement method employed. For example, a flag may be set to indicate if only a limited number of points are present in the leaf, in which case a direct coding mode may be used instead. Other embodiments may conditionally enable the predictive tree coding scheme based upon the local geometry around the leaf node, or around one or more of its ancestor nodes, or alternatively upon the type of leaf node (e.g., inferred direct coding mode vs. quantized leaf).

In some embodiments, octree leaf nodes encoded using inferred direct coding (IDCM) are excluded from further refinement by a predictive tree coder.

Some octree coding schemes may include explicit support for handling duplicate points, that is, multiple points with the same position. Since an octree structure cannot represent the same position twice, information is added to leaf nodes to indicate that a reconstructed point is to be repeated (duplicated) a certain number of times. When combining octree leaf nodes with a predictive tree coding scheme, the duplicate point count may not be signaled by the octree leaf node, rather, this may be handled by the predictive tree since the predictive tree is capable of representing more than one distinct point.

For a leaf node that employs predictive tree coding, one or more predictive coding trees may be signaled. For example, in some embodiments, the predictive tree may be constrained to lie within the bounds of the octree node. In such an embodiment, the binarisation of the residual magnitude may be limited to the size of the leaf node. For example, FIG. 3 illustrates an embodiment wherein the predictive tree representation of points a, b, and c does not extend beyond the leaf node within which it resides.

In other embodiments, the predictive tree may be allowed to exceed the bounds of the octree node within which it resides. In such an embodiment, an encoder may use such a scheme to merge points from neighboring nodes into a single prediction tree and avoid signaling that the neighboring nodes are occupied. This may be of benefit when one node contains a large number of points that just spill into the neighboring node, where instead of having to code two independent trees in neighboring nodes, a single tree is encoded. In some embodiments, the binarization of the residual magnitude may be limited to a size slightly larger than the octree node, thereby permitting some points from neighboring nodes to be merged, while maintaining compression efficiency in the residual magnitude representation.

Figure 4:
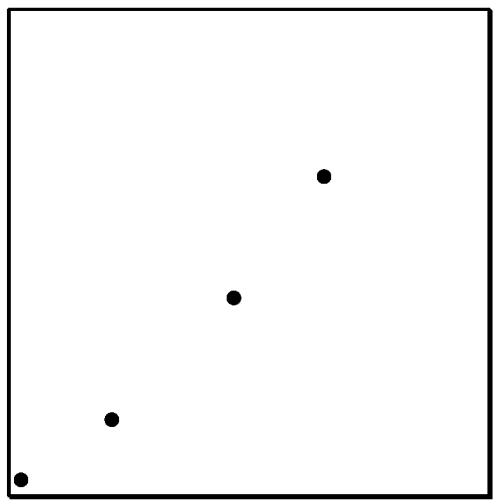
FIG. 4 illustrates an example octree-predictive tree combination structure that allows the predictive tree to encode a point outside the boundaries of an octree cube in which the predictive tree resides, according to some embodiments.
Figure 4:
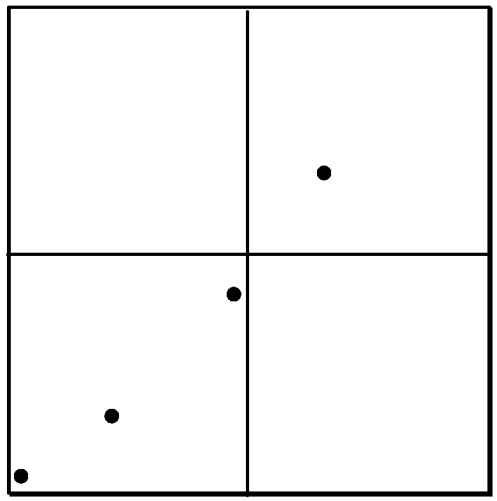
Figure 4:
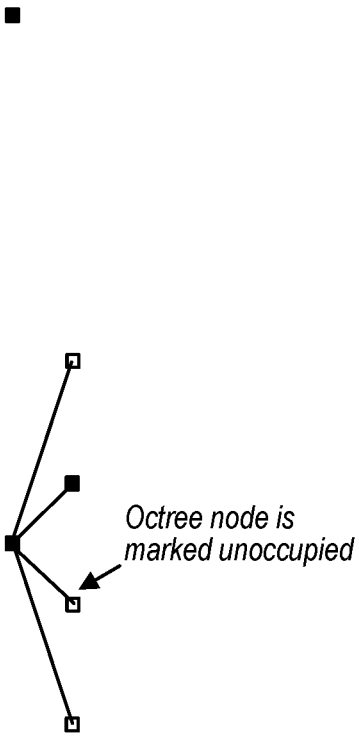
Figure 4:
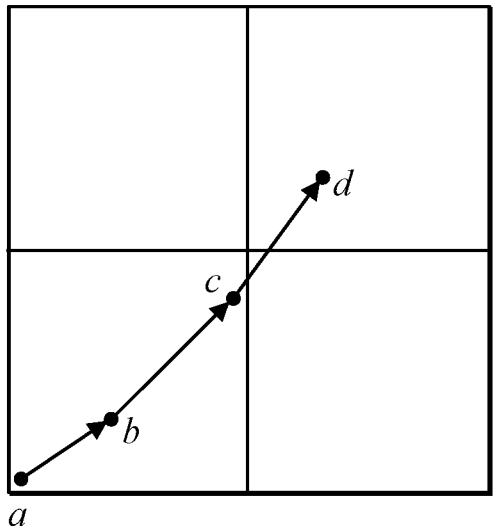
Figure 4:
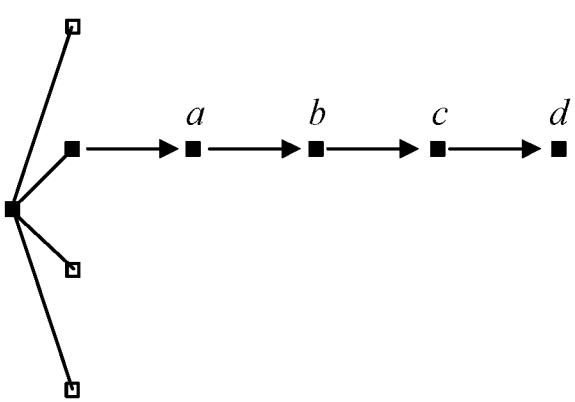

For example, FIG. 4 illustrates an example octree-predictive tree combination structure that allows the predictive tree to encode a point outside the boundaries of an octree cube in which the predictive tree resides, according to some embodiments.

Figure 5A:
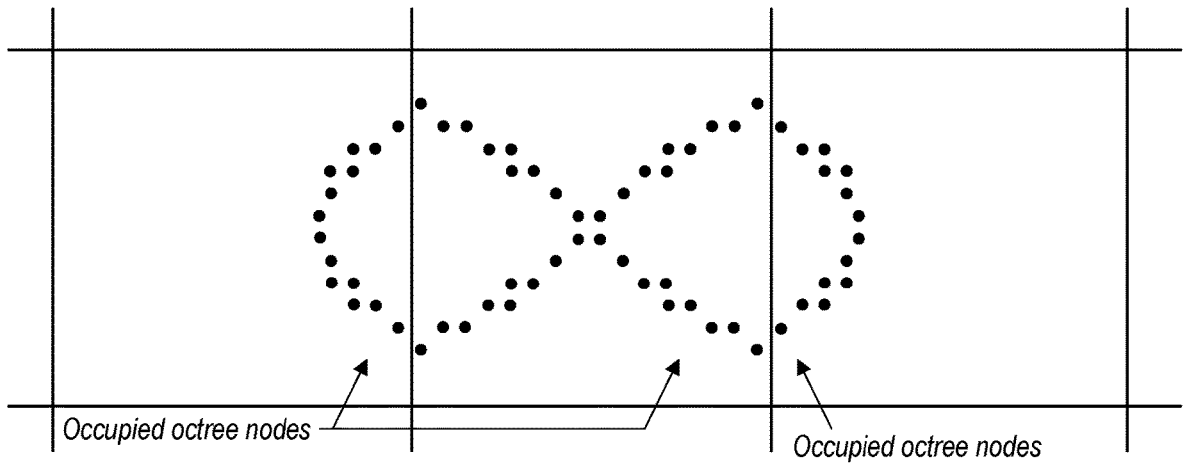
FIG. 5A illustrates an example set of points that span three occupied octree nodes, according to some embodiments.
Figure 5B:
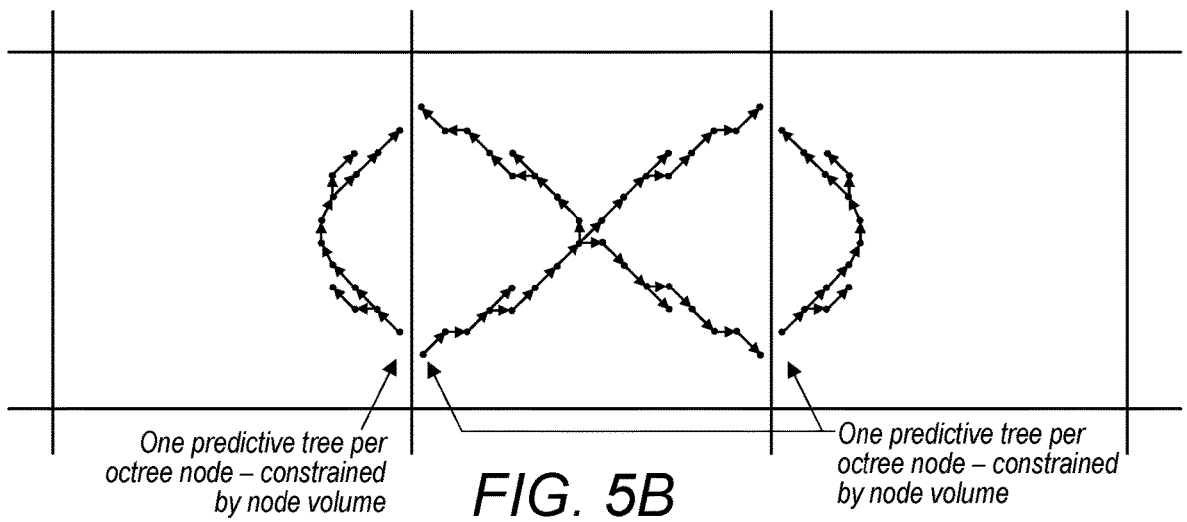
FIG. 5B illustrates an example embodiment wherein a predictive tree is constrained to its respective octree cube and three predictive trees are illustrated for the three occupied octree nodes, according to some embodiments.
Figure 5C:
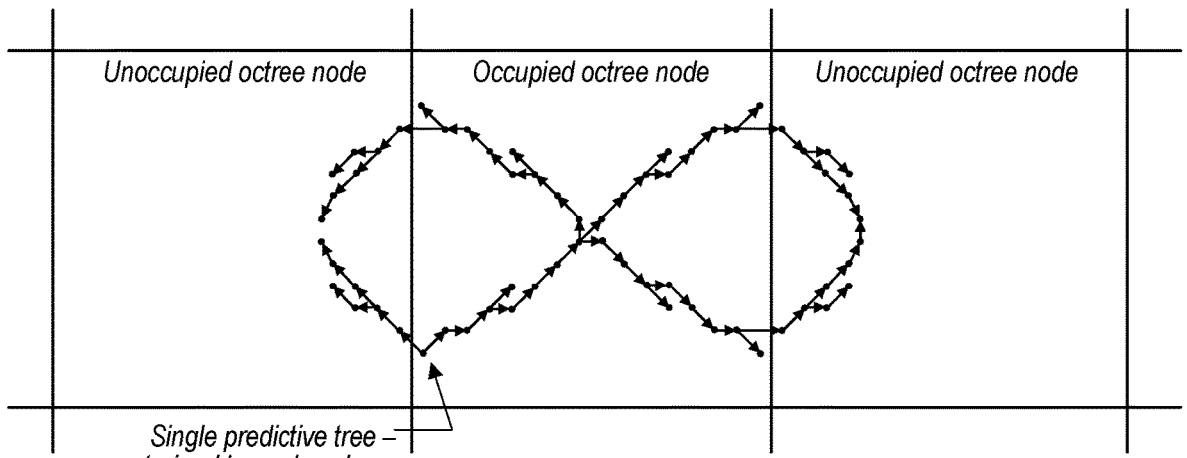
FIG. 5C illustrates example embodiment wherein a predictive tree is not constrained to its respective octree cube and a single predictive tree encodes the points spanning the three occupied octree nodes, according to some embodiments.

Also FIGS. 5A-5C illustrate how a single predictive tree may be encoded as opposed to three separate predictive trees, when the constraint is relaxed such that the predictive tree may exceed the bounds of the cube corresponding to the octree node within which it resides.

In some embodiments, different octree nodes may include independently determined predictive trees. For example, an independent predictive tree coding scheme may be informed of the number of output points that are to be produced by the set of predictive trees. After completing each predictive tree, if the total number of reconstructed points is not reached, a new tree may be implicitly started.

Signaling the number of points represented by the predictive trees refining an octree leaf node may be inefficient for compression, especially since the tree traversal (representation) is self-terminating. If only a single predictive tree is allowed per node then no node level point count information is sent. If multiple predictive trees are to be permitted, after coding each tree a single entropy coded flag may be signaled to indicate if the node is complete or if at least one additional tree follows.

Ordinarily, the first point (node) in the predictive coding tree must use the PCM mode (since there are no parent nodes to predict from). The PCM mode is effectively a prediction from (0,0,0). While it is possible to use the (0,0,0) position as the origin of each tree, it does not make full use of the information encoded in the octree. Each node of the octree represents a position quantized by $2^{(H-D)}$; this is sometimes called a partial position, or the position of the node at depth D.

In some embodiments, the scaled quantized position of the node (or some value associated with it) may be used as an offset to be applied to all positions reconstructed from the predictive coding trees present within the node. If pN is the quantized node position, Ps={Ps[0], . . . Ps[n]} may be the predictive coding tree outputs, and f(pN) may be a function that describes the position of the local origin for the predictive coding tree. If so, then the reconstructed point positions associated with the octree leaf node are Ps[i]+f(pN).

In some embodiments, f(pN) may be $pN*2^{(N-D)}$, describing the position of the 'bottom left' corner of the node relative to the octree origin.

In some embodiments, f(pN) may be $pN*2^{(N-D)}+2^{(N-D-1)}$, describing the center of the node relative to the octree origin.

In some embodiments, f(pN) may be $pN*2^{(N-D)}+$ NeighBias, where the centroid for the node is determined by the occupancy of neighboring octree nodes.

In some embodiments, points using the PCM mode may instead be predicted from f(Pn), rather than (0,0,0). This may avoid the need to apply an offset to each point position as an additional operation. It should be noted that in systems using integer arithmetic, these two embodiments may not be equivalent.

In some embodiments, the first point may be encoded using the PCM mode predicted from f(Pn), the second point may be encoded using one of the PCM modes that uses a prediction from a different value of f(Pn). In such an embodiment the n'th PCM point may use a prediction different from all previous values of f(Pn). The rationale for such a design is that the predictive tree can represent the local geometry around the initial origin. A second tree should be somehow disconnected from the first (otherwise its points can be represented in the first tree). Therefore the value of the PCM origin should change. One such design would use the octree node center for the first, each of the eight node corners for the next eight uses, etc.

In some embodiments, the entropy coders associated with the predictive tree may be retained for use by subsequent trees generated by the same octree. Alternatively, the context state associated with the coders may be reset at the start of each node, or octree level. A flag may be used to indicate if the context state should be reset.

In an octree-only or predictive-tree-only coding scheme, the encoded tree representation will typically form a contiguous stream of entropy coded symbols. When the two schemes are combined, it may be necessary to further take into account how the data for each scheme should be multiplexed together.

In some embodiments, as soon as a leaf node is identified with predictive tree data present, the predictive tree data may be immediately multiplexed into the coded symbol stream. However, this may result in inefficiency for an implementation (especially a decoder) which may have to save the octree decoding state and switch tasks to decoding the predictive tree data for the leaf node, before resuming the octree decoding. (This task switching is necessary since the only way to skip over a chunk of arithmetically coded symbols is to decode them according to their syntax and semantics). Switching tasks increases the implementation state requirements and may reduce the effective data/instruction locality due to cache effects arising from interleaving the two workloads.

In some embodiments, an alternative to interleaving the data on a per-node basis is to separate the octree and predictive trees into different phases. In the first phase (octree processing), leaf nodes that use predictive tree coding are recorded. After octree coding is complete, each leaf node is processed in turn to encode or decode the corresponding predictive tree(s). In effect all the octree entropy coded symbols are contiguous (ignoring any other coded data that may be multiplexed with the octree data such as attribute data), and are followed by the contiguous entropy coded predictive tree symbols.

In some embodiments, a balance between the two extremes (per-node interleaving vs. sequential processes) may involve interleaving on a per octree level basis. Wherein, any leaf nodes encountered during the coding of an octree level are recorded and deferred for predictive tree coding until the end of the level.

In some embodiments, the encoded predictive tree data may reside in a different entropy encoded sub stream than the octree occupancy information. Pointers, embedded length fields, or other external means may identify the start of each sub stream. The sub streams may then be encoded or decoded independently in a parallel manner. One such arrangement is to put predictive tree data into a separate slice/dependent slice/entropy slice/data unit.

An efficient octree coder makes extensive use of contextualization to entropy code node occupancy information. One such example is, for a breadth-first tree traversal, contextualization based upon the occupancy of neighboring nodes. For example, a node surrounded by four occupied neighbors left, right, front and back, is likely to have a different occupancy to a node that just has a single occupied neighbor.

In the context of a combined octree and predictive tree encoder, it may be desirable to allow information determined from the predictive tree to inform the neighbor determination process of the octree. Such a feature may be available if the predictive tree data of an octree node is decoded during octree reconstruction due to causality. In order to make the neighborhood information available, the reconstructed points from the predictive tree(s) must be converted into an octree representation and inserted into the octree being decoded. This is performed by recursively determining occupancy until all levels of the subtree are represented. The new octree subtree is marked as a not-to-be-decoded node and inserted into the octree to replace the originating node. Such a process may be interleaved with normal octree decoding in a similar manner to octree construction. The first level occupancy is determined and child nodes are added to the queue (fifo) of nodes to be processed. Each time a not-to-be-decoded node is encountered by the octree traversal process (e.g. removed from the queue/fifo) its child occupancy is determined without decoding any further information.

In some embodiments, instead of including predictive trees in octree nodes, the reverse may be performed. For example, for a point cloud with sparse and dense regions, a predictive tree may be used to create a structure defining relationships between the dense regions and the respective dense regions may be defined using separate octree at leaf nodes of the predictive tree. In some embodiments, whether or not to encode a given region using an octree structure or a predictive tree structure may be determined based on respective point densities of the regions. For example, regions with point densities less than a threshold density may be encoded using a predictive tree structure, while other regions with point densities greater than the threshold density may be encoded using an octree structure.

For example, while octree coding can be an efficient means to compress dense geometry information, it comes at the price of latency, especially if the tree is represented or traversed in a breadth-first manner. For instance, in order to code the occupancy map of the root node, it is necessary to know the occupancy of the eight children. For any unoccupied child, this is not knowable without observing all points in the point cloud. In contrast, a predictive tree coder is capable of representing points in acquisition order with an encoder defined latency depending upon the tree construction, enabling bounded low-latency applications. If a predictive tree coder is used to refine the leaf nodes of the octree, then the system as a whole retains the high latency characteristics of the octree. An alternative construction is to use the predictive tree coder first to represent the root node positions of multiple octrees (one octree per predictive tree node).

In some embodiments, for a point cloud comprising P-bit position information, the first M common bits of each position may be coded using a predictive tree coder. Each M-bit position produced by the predictive tree coder may further be refined into a set of output points by an octree with a root node at the same M-bit position. In some embodiments each predictive tree node may indicate the number of M-bits it represents, thereby controlling the extent of the octree refining that node. It should be understood that the values of P and M may vary for each of the x, y, and z position components. For example, a point cloud representing the internal structure of a building may contain a combination of dense regions (walls) and sparse voids (rooms). Such a point cloud may be more efficiently coded by encoding each wall using a non-cubic octree that is narrow, wide and high, while the location of the wall in the room is encoded using the predictive tree.

In other embodiments, the predictive tree coder may represent the full P-bit position of a subset of the point cloud points, called seed points. An M-bit octree is constructed around each seed position, such that the octree contains the seed position. In order to avoid coding inefficiency, some embodiments can infer that octree nodes spatially containing the seed position must be occupied and can avoid signaling any corresponding occupancy information. In some embodiments, it can be inferred that octree nodes spatially adjacent to a node containing the seed position are adjacent to an occupied node, even though occupancy information indicating the nodes presence has not been signaled.

Also in some embodiments other combinations of predictive trees and octrees may be combined. For example a "sandwich" type model may use a predictive tree at a high level that includes octrees at leaf nodes of the predictive tree. Additionally, leaf nodes of the octree may include lower level predictive trees for the respective leaf nodes of the octree.

In another embodiment, a predictive tree coding layer may exist between two octree coding layers, in effect, replacing a number of octree levels in a single octree. In some embodiments, the octree levels subsequent to the predictive tree coding layer comprise a single logical octree. To use the octree of FIG. 2 as an example, the middle two octree levels may be replaced by a predictive tree coding layer. Two predictive trees result in four partial point positions that are treated as internal nodes of the whole octree. After coding the predictive layer, octree coding resumes as if the generated internal nodes had been generated by parent levels of the octree. In such an embodiment, each subtree of the generated internal nodes is able to access information contained in neighboring subtrees for the purposes of entropy contextualization and prediction.

Duplicate Points

For sequences with large numbers of duplicate points (e.g. point residing at the same or similar spatial location) inefficiency may be reduced by adding a per-node count of the number of duplicate points. This may be signaled using an exp-golomb code (or another code depending upon the expected distribution of duplicate points, for example, a first arithmetically encoded flag may be signaled to indicate if there is at least one duplicate point, and if there is at least one duplicate point, the number of duplicate points minus one is encoded). During reconstruction a decoder may insert the duplicate points into the output buffer and ensure that the indices of any duplicate points are not used as prediction of subsequent tree nodes.

In some embodiments, an encoder may identify duplicate points in various ways. If points are expected to arrive in order, for example in Morton order, or capture order, duplicate points can be expected to be sequential in the stream. In such a case, at the start of processing each input point, the encoder looks ahead for duplicate points (possibly within a window for low-latency cases).

Signaling the duplicate count for each node is easy to parse, but means that each node has the overhead of signaling a duplicate count (even if it the zero symbol can be compressed well due to efficient entropy coding). An alternative approach may only present the duplicate count syntax element when particular conditions are met as follows. If the node uses DPCM (direct pulse code modulation) prediction (e.g. uses a single parent for prediction) and has a zero residual, the duplicate count is sent. The effect of this is that duplicate points require two nodes for signaling. The first indicates the initial point, the second indicates the duplicate count.

In some embodiments, the conditionality on the zero residual is removed, and instead, all nodes using dpcm prediction may signal the duplicate point count.

In some embodiments, the node with a positive duplicate point count is considered as a terminal (leaf) node of the prediction tree and may not be used for further prediction. In these embodiments, it is not necessary to signal the child count.

In some embodiments, the duplicate point count may only be present in the first child node. For example, if four points are to be encoded, three of which have identical positions, the tree is constructed as a first node (that contains no duplicate point count) with two child nodes, the first child contains a duplicate point count, and the second child does not. In another embodiment, the duplicate point count (when present) is the first value signaled in a node and conditionality is only upon the node being a first child. This may be of benefit if the cost of signaling the mode information is greater than the cost of signaling the duplicate point count for first child nodes.

In some embodiments, instead of being contextualized on the DPCM prediction mode, a dedicated prediction mode may be used that indicates the duplicate point count without a residual.

In embodiments where octree coding refines the output of a predictive tree coder, only a single octree needs to be represented by each predictive tree node and the ability for the predictive coder to explicitly signal a duplicate point count is disabled.

Figure 6A:
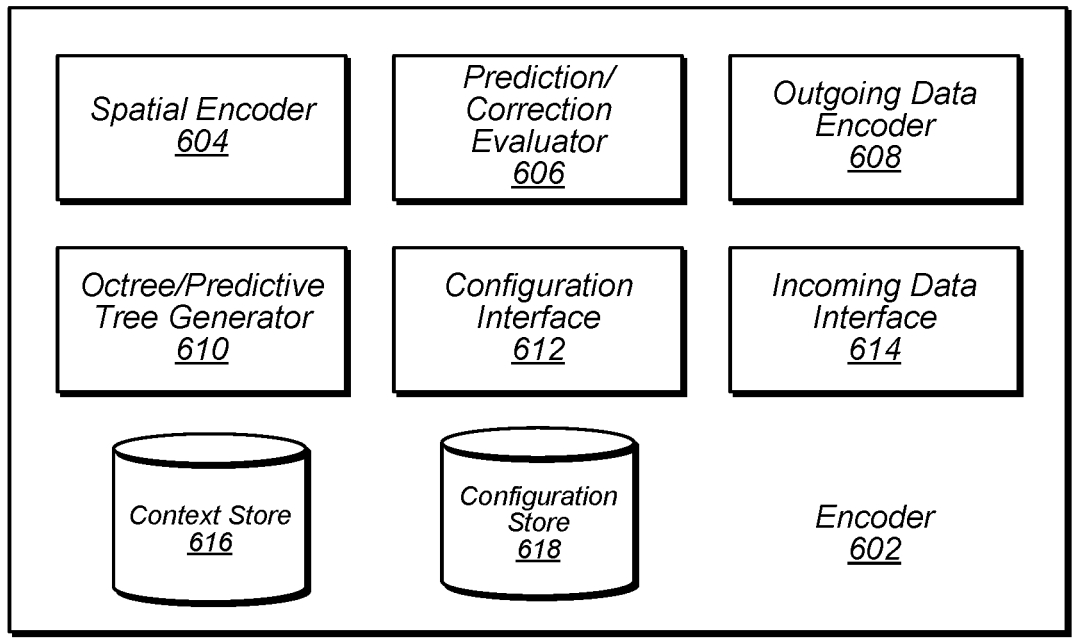
FIG. 6A illustrates components of an encoder, according to some embodiments.

FIG. 6A illustrates components of an encoder, according to some embodiments.

Encoder 602 may be a similar encoder as encoder 104 illustrated in FIG. 1A. Encoder 602 includes spatial encoder 604, octree/predictive tree generator 610, prediction/correction evaluator 606, incoming data interface 614, and outgoing data interface 608. Encoder 602 also includes context store 616 and configuration store 618.

In some embodiments, a spatial encoder, such as spatial encoder 604, may compress spatial information associated with points of a point cloud, such that the spatial information can be stored or transmitted in a compressed format. In some embodiments, a spatial encoder, such as spatial encoder 604, may utilize octrees and/or predictive trees to compress spatial information for points of a point cloud as discussed in more detail herein.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud.

An octree/predictive tree generator, such as octree/predictive tree generator 610, may utilize spatial information for points of a point cloud to generate an octree that subdivides a point cloud into cubes and sub-cubes. Furthermore the octree may include one or more predictive trees. Or, a predictive tree may include one or more octrees.

A prediction/correction evaluator, such as prediction/correction evaluator 606 of encoder 602, may determine predicted attribute values for points of a point cloud based on an inverse distance interpolation method using attribute values of the K-nearest neighboring points of a point for whom an attribute value is being predicted. The prediction/correction evaluator may also compare a predicted attribute value of a point being evaluated to an original attribute value of the point in a non-compressed point cloud to determine an attribute correction value. In some embodiments, a prediction/correction evaluator, such as prediction/correction evaluator 606 of encoder, 602 may adaptively adjust a prediction strategy used to predict attribute values of points in a given neighborhood of points based on a measurement of the variability of the attribute values of the points in the neighborhood.

An outgoing data encoder, such as outgoing data encoder 608 of encoder 602, may encode attribute correction values and assigned attribute values included in a compressed attribute information file for a point cloud. In some embodiments, an outgoing data encoder, such as outgoing data encoder 608, may select an encoding context for encoding a value, such as an assigned attribute value or an attribute correction value, based on a number of symbols included in the value. In some embodiments, values with more symbols may be encoded using an encoding context comprising Golomb exponential encoding, whereas values with fewer symbols may be encoded using arithmetic encoding. In some embodiments, encoding contexts may include more than one encoding technique. For example, a portion of a value may be encoded using arithmetic encoding while another portion of the value may be encoded using Golomb exponential encoding. In some embodiments, an encoder, such as encoder 602, may include a context store, such as context store 616, that stores encoding contexts used by an outgoing data encoder, such as outgoing data encoder 608, to encode attribute correction values and assigned attribute values.

In some embodiments, an encoder, such as encoder 602, may also include an incoming data interface, such as incoming data interface 614. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 614 of encoder 602.

In some embodiments, an encoder, such as encoder 602, may further include a configuration interface, such as configuration interface 612, wherein one or more parameters used by the encoder to compress a point cloud may be adjusted via the configuration interface. In some embodiments, a configuration interface, such as configuration interface 612, may be a programmatic interface, such as an API. Configurations used by an encoder, such as encoder 602, may be stored in a configuration store, such as configuration store 618.

In some embodiments, an encoder, such as encoder 602, may include more or fewer components than shown in FIG. 6A.

Figure 6B:
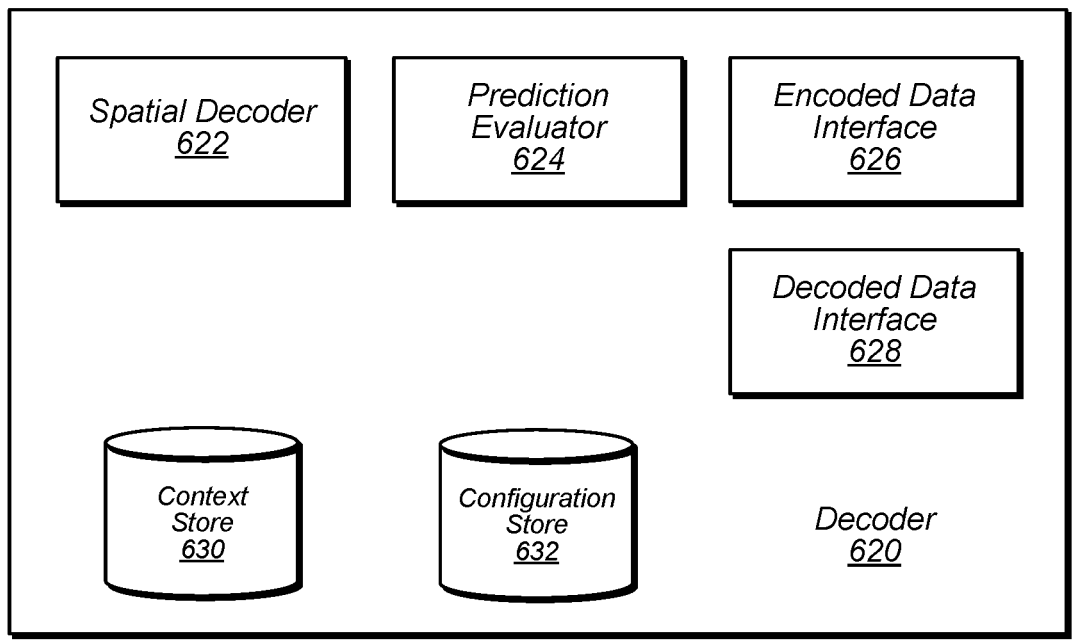
FIG. 6B illustrates components of a decoder, according to some embodiments.

FIG. 6B illustrates components of a decoder, according to some embodiments.

Decoder 620 may be a similar decoder as decoder 116 illustrated in FIG. 1A. Decoder 620 includes encoded data interface 626, spatial decoder 622, prediction evaluator 624, context store 630, configuration store 632, and decoded data interface 628.

A decoder, such as decoder 620, may receive an encoded compressed point cloud and/or an encoded compressed attribute information file for points of a point cloud. For example, a decoder, such as decoder 620, may receive a compressed attribute information file and/or a compressed spatial information file. The compressed attribute information file and/or compressed spatial information file may be received by a decoder via an encoded data interface, such as encoded data interface 626. The encoded compressed point cloud may be used by the decoder to determine spatial information for points of the point cloud. For example, spatial information of points of a point cloud included in a compressed point cloud may be generated by a spatial decoder, such as spatial decoder 622. In some embodiments, a compressed point cloud may be received via an encoded data interface, such as encoded data interface 626, from a storage device or other intermediary source, wherein the compressed point cloud was previously encoded by an encoder, such as encoder 104. In some embodiments, an encoded data interface, such as encoded data interface 626, may decode spatial information. For example the spatial information may have been encoded using various encoding techniques as described herein.

A prediction evaluator of a decoder, such as prediction evaluator 624, may select a starting point of a minimum spanning tree based on an assigned starting point included in a compressed attribute information file. In some embodiments, the compressed attribute information file may include one or more assigned values for one or more corresponding attributes of the starting point. In some embodiments, a prediction evaluator, such as prediction evaluator 624, may assign values to one or more attributes of a starting point in a decompressed model of a point cloud being decompressed based on assigned values for the starting point included in a compressed attribute information file. A prediction evaluator, such as prediction evaluator 624, may further utilize the assigned values of the attributes of the starting point to determine attribute values of neighboring points. For example, a prediction evaluator may select a next nearest neighboring point to the starting point as a next point to evaluate, wherein the next nearest neighboring point is selected based on a shortest distance to a neighboring point from the starting point in the minimum spanning tree. Note that because the minimum spanning tree is generated based on the same or similar spatial information at the decoder as was used to generate a minimum spanning tree at an encoder, the decoder may determine the same evaluation order for evaluating the points of the point cloud being decompressed as was determined at the encoder by identifying next nearest neighbors in the minimum spanning tree.

A decoder, such as decoder 620, may provide a decompressed point cloud generated based on a received compressed point cloud and/or a received compressed attribute information file to a receiving device or application via a decoded data interface, such as decoded data interface 628. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Example Applications for Point Cloud Compression and Decompression

Figure 7:
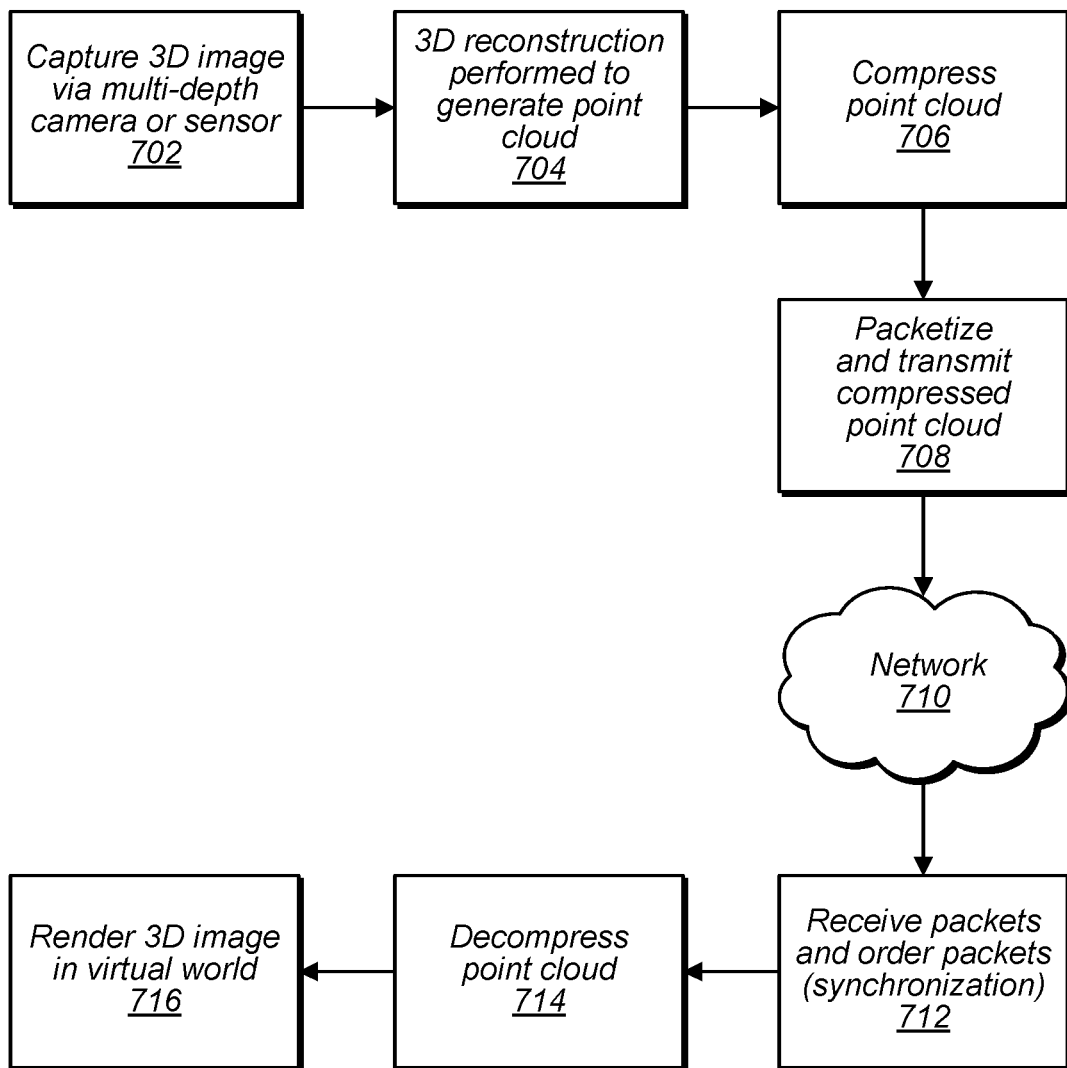
FIG. 7 illustrates compressed point cloud information being used in a 3-D application, according to some embodiments.

FIG. 7 illustrates compressed point clouds being used in a 3-D application, according to some embodiments.

In some embodiments, a sensor, such as sensor 102, an encoder, such as encoder 104 or encoder 202, and a decoder, such as decoder 116 or decoder 220, may be used to communicate point clouds in a 3-D application. For example, a sensor, such as sensor 102, at 702 may capture a 3D image and at 704, the sensor or a processor associated with the sensor may perform a 3D reconstruction based on sensed data to generate a point cloud.

At 706, an encoder such as encoder 104 or 202 may compress the point cloud and at 708 the encoder or a post processor may packetize and transmit the compressed point cloud, via a network 710. At 712, the packets may be received at a destination location that includes a decoder, such as decoder 116 or decoder 220. The decoder may decompress the point cloud at 714 and the decompressed point cloud may be rendered at 716. In some embodiments a 3-D application may transmit point cloud data in real time such that a display at 716 represents images being observed at 702. For example, a camera in a canyon may allow a remote user to experience walking through a virtual canyon at 716.

Figure 8:
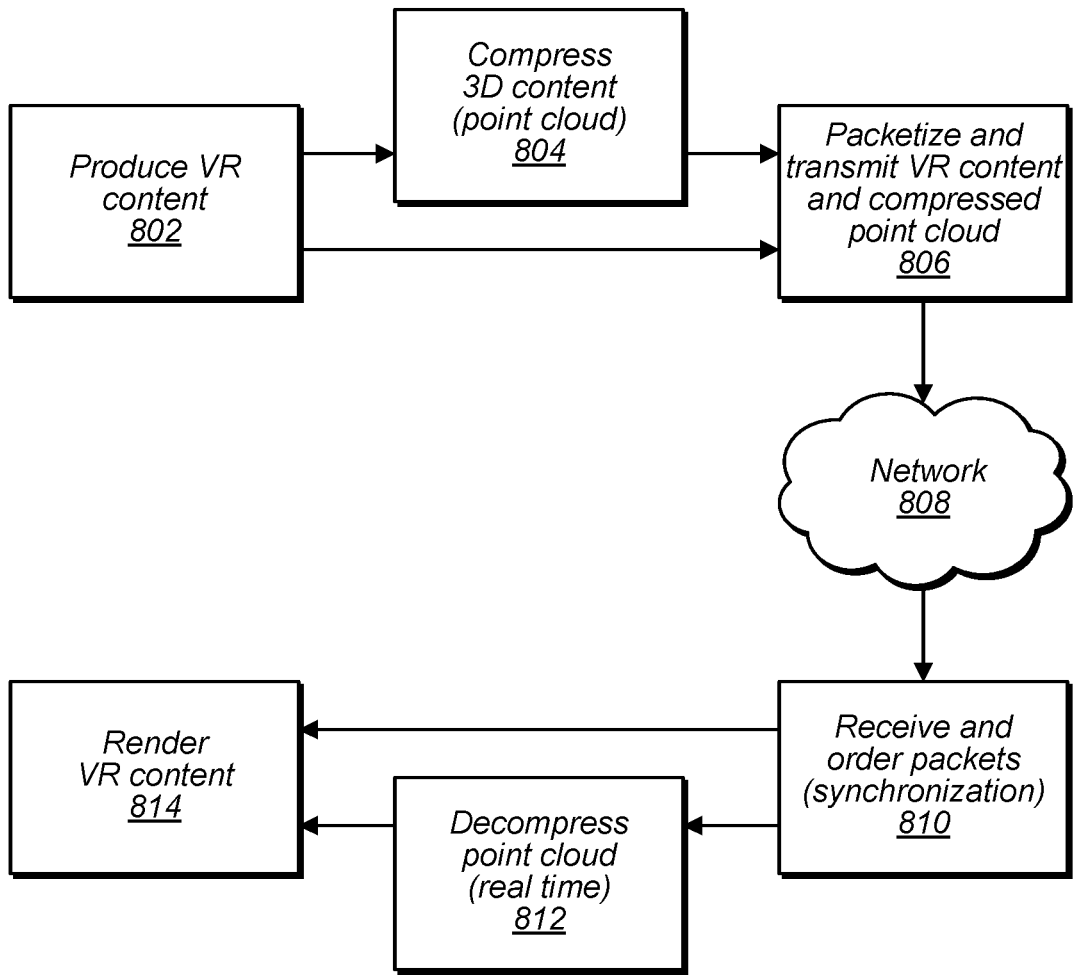
FIG. 8 illustrates compressed point cloud information being used in a virtual reality application, according to some embodiments.

FIG. 8 illustrates compressed point clouds being used in a virtual reality (VR) or augmented reality (AR) application, according to some embodiments.

In some embodiments, point clouds may be generated in software (for example as opposed to being captured by a sensor). For example, at 802 virtual reality or augmented reality content is produced. The virtual reality or augmented reality content may include point cloud data and non-point cloud data. For example, a non-point cloud character may traverse a landscape represented by point clouds, as one example. At 804, the point cloud data may be compressed and at 806 the compressed point cloud data and non-point cloud data may be packetized and transmitted via a network 808. For example, the virtual reality or augmented reality content produced at 802 may be produced at a remote server and communicated to a VR or AR content consumer via network 808. At 810, the packets may be received and synchronized at the VR or AR consumer's device. A decoder operating at the VR or AR consumer's device may decompress the compressed point cloud at 812 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 9:
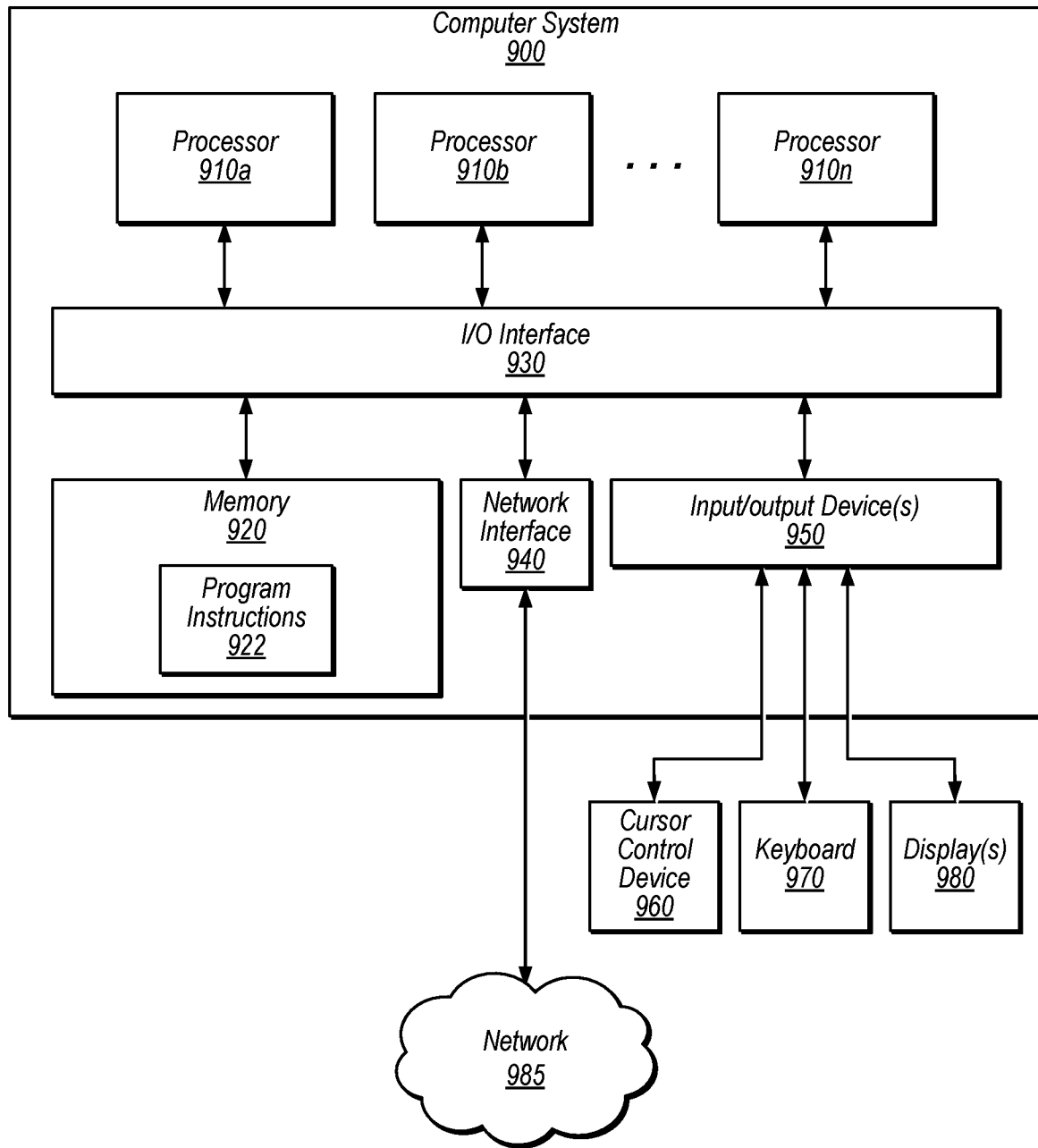
FIG. 9 illustrates an example computer system that may implement an encoder or decoder, according to some embodiments.

FIG. 9 illustrates an example computer system 900 that may implement an encoder or decoder or any other ones of the components described herein, (e.g., any of the components described above with reference to FIGS. 1-8), in accordance with some embodiments. The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store point cloud compression or point cloud decompression program instructions 922 and/or sensor data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement an image sensor control application incorporating any of the functionality described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer readable, medium storing program instructions, that when executed by one or more processors, cause the one or more processors to:
  partition a plurality of points of three-dimensional (3D) volumetric content into an octree comprising a plurality of cubes and sub-cubes at different levels of the octree; and
  for a set of occupied cubes, occupied with two or more points, at a given octree level:
    determine whether respective ones of the occupied cubes are to be further partitioned or whether the two or more points of the respective cubes are to be defined using a predictive tree structure;
    determine occupancy symbols indicating occupancy states of the sub-cubes of the cubes at the given octree level that are to be further partitioned;
    determine predictive tree structures for other ones of the respective occupied cubes corresponding to nodes of the octree that are not to be further partitioned; and
    encode the occupancy symbols and the predictive tree structures in an encoded bit stream for the 3D volumetric content.

2. The non-transitory, computer-readable, medium of claim 1, wherein to determine the occupancy symbols, determine the predictive tree structures, and encode the occupancy symbols and the predictive tree structures in the encoded bit stream, the program instructions, when executed by the one or more processors, cause the one or more processors to:
  traverse the octree in a breadth-first order for a plurality of levels of the octree;
  encode the occupancy symbols determined for the plurality of levels of the octree; and
  encode the predictive tree structures determined for the other ones of the respective occupied nodes of the octree that are not to be further partitioned.

3. The non-transitory, computer-readable, medium of claim 1, wherein to determine the occupancy symbols, determine the predictive tree structures, and encode the occupancy symbols and the predictive tree structures in the encoded bit stream, the program instructions, when executed by the one or more processors, cause the one or more processors to:
  traverse the octree in a breadth-first order for a given level of the octree;
  encode occupancy symbols determined for sub-cubes of the given level of the octree that are to be further partitioned;
  encode predictive tree structures determined for other ones of the occupied nodes of the given level of the octree that are not to be further partitioned; and
  repeat said traversing, said encoding the occupancy symbols, and said encoding the predictive tree structures for one or more additional levels of the octree.

4. The non-transitory, computer-readable, medium of claim 1, wherein to encode the occupancy symbols and the predictive tree structures in the encoded bit stream, the program instructions, when executed by the one or more processors, cause the one or more processors to:
  encode a flag value for the nodes of the octree that are not to be further partitioned for which a predictive tree structure is being encoded.

5. The non-transitory, computer-readable, medium of claim 4, wherein to encode the occupancy symbols and the predictive tree structures in the encoded bit stream, the program instructions, when executed by the one or more processors, further cause the one or more processors to:
  determine respective contexts for respective ones of the nodes of the octree that are not to be further partitioned; and
  determine whether or not to encode a flag value indicating an associated encoded predictive tree structure for the nodes that are not to be further partitioned based on determined contexts for one or more neighboring nodes of a given one of the nodes that is not to be further partitioned that is being evaluated.

6. The non-transitory, computer-readable, medium of claim 1, wherein the determined predictive tree structures comprise one or more of:
  a prediction tree structure that indicates prediction is to be performed based on a position of the node that is not to be further partitioned;
  a prediction tree structure that indicates prediction is to be performed based on a position of a parent node in the octree corresponding to the node that is not to be further partitioned; or
  a prediction tree structure that indicates prediction is to be performed based on a position of a parent node and grand-parent node in the octree corresponding to the node that is not to be further partitioned.

7. The non-transitory, computer-readable, medium of claim 1, wherein, the program instructions, when executed by the one or more processors, further cause the one or more processors to:
  encode residual values to be used to corrected predicted locations predicted using the predictive tree-structures signaled in the bit stream.

8. The non-transitory, computer-readable, medium of claim 1, wherein for a given one of the nodes that is not to be further partitioned, a given predictive tree structure for the given node is contained within a volume of the sub-cube corresponding to the given node.

9. The non-transitory, computer-readable, medium of claim 1, wherein for a given one of the nodes that is not to be further partitioned, a given predictive tree structure for the given node extends at least partially beyond a volume of the sub-cube corresponding to the given node.

10. The non-transitory, computer-readable, medium of claim 1, wherein for at least one of the occupied sub-cubes of the octree that is not to be further partitioned in the octree, the program instructions, when executed by the one or more processors, cause the one or more processors to:
  perform said determining the predictive tree structure; and
  for at least one branch of the predictive tree structure:
    determine an additional octree for a set of points in the at least one occupied sub-cube, wherein a leaf node of the at least one branch of the predictive tree serves as a seed node for the additional octree; and
    encode the additional octree in the bit stream.

11. The non-transitory, computer-readable, medium of claim 10, wherein the program instructions, when executed by the one or more processors, cause the one or more processors to:
  determine another predictive tree structure for at least one node of the additional octree that is not to be further partitioned; and
  encode the additional predictive tree in the bit stream.

12. A non-transitory, computer readable, medium storing program instructions, that when executed by one or more processors, cause the one or more processors to:
  receive a bit stream comprising encoded octree occupancy symbols and encoded indicators of predictive tree structures for use in recreating a 3D representation of compressed volumetric content; and reconstruct the 3D representation of compressed volumetric content, wherein to reconstruct the 3D representation of compressed volumetric content, the program instructions, when executed by the one or more processors, cause the one or more processors to:

decode the encoded occupancy symbols to re-create an octree structure;

predict locations of points included in the predictive tree structures; and spatially locate the points predicted via the predictive tree structures in a set of points whose locations are indicated by the re-created octree structure.

13. The non-transitory, computer readable, medium of claim 12, wherein to spatially locate the points predicted via the predictive tree structures the program instructions, when executed by one or more processors, cause the one or more processors to:

determine a local origin point for the predictive tree, wherein the local origin point is associated with a sub-cube of the reconstructed octree and a corresponding node of the reconstructed octree with which the predictive tree structure is associated;

predict locations of points of the predictive tree structure from a global origin point;

determine a transfer function that translates global origin to the local origin such that the points of the predictive tree structure are relocated from a position relative to the global origin point to new locations relative to the local origin point in the sub-cube corresponding to the node of the octree with which the predictive tree structure is associated; and apply the transfer function to the predicted locations of the points of the predictive tree to move the points of the predicted tree.

14. The non-transitory, computer readable, medium of claim 12, wherein to spatially locate the points predicted via the predictive tree structures the program instructions, when executed by one or more processors, cause the one or more processors to:

determine a local origin point for the predictive tree, wherein the local origin point is associated with a sub-cube of the reconstructed octree and a corresponding node of the reconstructed octree with which the predictive tree structure is associated; and predict locations of points of the predictive tree structure from the local origin point.

15. The non-transitory, computer readable, medium of claim 14, wherein the local origin point is one or more of the following:

a corner of the sub-cube corresponding to the node of the octree with which the predictive tree structure is associated;

a center points of the sub-cube corresponding to the node of the octree with which the predictive tree structure is associated; or a point defined by a function that uses a location of the sub-cube corresponding to the node of the octree with which the predictive tree structure is associated is an input to the function.

16. The non-transitory, computer-readable, medium of claim 12, wherein the received encoded bit stream further comprises residual values for the predictive tree, and wherein the program instructions, when executed by the one or more processors, further cause the one or more processors to:

adjust the predicted locations of the points included in the predictive tree structures based on the residual values included in the bit stream for the predictive tree structures.

17. A non-transitory, computer readable, medium storing program instructions, that when executed by one or more processors, cause the one or more processors to:

determine a predictive tree-structure for use in predicting locations of a plurality of points included in three-dimensional (3D) volumetric content; and for at least one branch of the predictive tree-structure:

partition a plurality of points of the 3D volumetric content associated with the at least one branch into an octree comprising a plurality of cubes and sub-cubes at different levels of the octree;

determine occupancy symbols indicating occupancy states of the sub-cubes of the cubes; and encode the predictive tree structure and the occupancy symbols an encoded bit stream for the 3D volumetric content.

18. The non-transitory, computer-readable, medium of claim 17, wherein the program instructions, when executed by the one or more processors, further cause the one or more processors to:

for a set of occupied cubes, occupied with two or more points, at a given octree level of the octree associated with the at least one branch of the predictive tree structure:

determine whether respective ones of the occupied cubes are to be further partitioned or whether the two or more points of the respective cubes are to be defined using an additional predictive tree structure;

determine occupancy symbols indicating occupancy states of the sub-cubes of the cubes at the given octree level that are to be further partitioned;

determine one or more additional predictive tree structures for other ones of the respective occupied cubes corresponding to nodes of the octree that are not to be further partitioned; and encode the predictive tree structure, the occupancy symbols for the octree structure for the at least one branch of the predictive tree structure, and the one or more additional predictive tree structures in the encoded bit stream for the 3D volumetric content.

19. The non-transitory, computer-readable, medium of claim 17, wherein the at least one branch of the predictive tree structure that includes the octree comprises a portion of the 3D volumetric content that comprises densely populated points and that is adjacent to one or more other portions of the 3D volumetric content that is sparsely populated with points.

20. The non-transitory, computer-readable, medium of claim 19, wherein the program instructions, when executed by the one or more processors, further cause the one or more processors to:

determine respective point densities for portions of the 3D volumetric content associated with respective branches of the predictive tree structure;

for a branch having a point density greater than a threshold density, generate an octree for the points associated with the branch; and for another branch having a point density less than the threshold density, generate an additional predictive tree branch for the points associated with the branch.

21. The non-transitory, computer-readable, medium of claim 17, wherein the 3D volumetric content is a point cloud comprising a plurality of points, wherein respective ones of the points comprise spatial information for the point and/or attribute information for the point.

\* \* \* \* \*